US005692440A

United States Patent [19]

Hillebrand

[11] Patent Number: 5,692,440

[45] Date of Patent: Dec. 2, 1997

[54] CUTTING DEVICE

[75] Inventor: Bernd Anton Hillebrand, Bergrheinfeld, Germany

[73] Assignee: Koenig & Bauer-Albert Aktiengesellschaft, Wurzburg, Germany

[21] Appl. No.: 650,790

[22] Filed: May 20, 1996

[30] Foreign Application Priority Data

May 20, 1995 [DE] Germany ........................... 195-18-650

[51] Int. Cl.[6] ............................. B41F 13/56; B23D 25/02

[52] U.S. Cl. ......................... 101/226; 101/224; 270/21.1; 83/305; 83/337; 83/343

[58] Field of Search .................................... 101/226, 224; 83/305, 337, 343; 270/5.02, 6, 20.1, 21.1, 43, 47, 52.09; 493/424–432, 359, 360, 363, 365, 471, 469, 241

[56] References Cited

U.S. PATENT DOCUMENTS

| | | | |
|---|---|---|---|
| 3,946,629 | 3/1976 | Achelpohl | 83/304 |
| 4,009,626 | 3/1977 | Gressman | 83/116 |
| 4,685,318 | 8/1987 | Ueda et al. | 72/185 |
| 4,742,741 | 5/1988 | Hallberg et al. | 83/37 |
| 5,048,387 | 9/1991 | Niitsuma et al. | 83/344 |
| 5,096,174 | 3/1992 | Nishihara | 270/47 |
| 5,468,209 | 11/1995 | Rohrhiursch et al. | 493/424 |
| 5,527,256 | 6/1996 | Vauchelle et al. | 493/424 |

FOREIGN PATENT DOCUMENTS

| | | |
|---|---|---|
| 0 364 864 | 4/1990 | European Pat. Off. . |
| 1 105 698 | 4/1961 | Germany . |
| 39 34 673 | 7/1993 | Germany . |

*Primary Examiner*—Edgar S. Burr
*Assistant Examiner*—Dave A. Ghatt
*Attorney, Agent, or Firm*—Jones, Tullar & Cooper, P.C.

[57] ABSTRACT

A cutting device for transversely severing a printed web into signatures utilizes a collection and counter-cylinder, in cooperation with a cutting cylinder support that carries two cutting cylinders. Each cutting cylinder is rotatable with respect to the cutting cylinder support. These two cutting cylinders are also both axially shiftable on the cutting support cylinder to vary the lengths of the signatures being cut.

6 Claims, 2 Drawing Sheets

CUTTING DEVICE

FIELD OF THE INVENTION

The present invention is directed generally to a cutting device. More particularly, the present invention is directed to a device for transversely cutting a running web into cut products. Most specifically, the present invention is directed to a cutting device for transversely cutting a running web into products of variable lengths. The cutting device is situated in a folding apparatus that is disposed downstream, in the direction of travel of the web, from a rotary printing press that is used to print the web. The cutting device has two cutting cylinders which are supported for rotation with, as well as with respect to, a cutting cylinder support. These cutting cylinders carry cutters that engage cutting strips on the surface of a cooperatively located collection and counter-cylinder.

DESCRIPTION OF THE PRIOR ART

It is generally well known to transversely cut a running web after the web has been printed. The cut web segments or signatures can be folded or can be collected and then folded. It is typical to utilize a cutting blade cylinder and a cooperating counter cut cylinder or collection cylinder provided with a plurality of axially extending cutting strips or bars to transversely cut the printed web.

One such prior art cutting device is shown in European Patent Publication EP 0 364 864 E2. This cutting device is situated in the folding apparatus of a rotary printing press and utilizes a cutting cylinder which is provided with two cutters and which cooperates with a collection cylinder having three cutting strips. The several cutters on the cutting cylinder dip or extend into the corresponding cutting strips during the transverse cutting of the web into cut products. The cutting device can be adjusted to various product lengths and can then generate alternating length products.

A limitation of this prior art device is that the cutters perform a cycloidal movement in their cooperating cutting strips. This cycloidal movement results in substantial wearing away of the cutting strips, which are typically made of plastic or another similar resilient material. In this prior art device, it is also difficult to adjust the apparatus to different product lengths. The design of the cutting device, so that it can be adjusted for different product lengths, is quite complicated.

Another prior art cutting device is shown in German Patent Publication DE 39 34 673 C2. This cutting device is also capable of being varied in its format length. A cutter support bar is pivotably seated on a counter-cylinder. The format length can be varied by use of an adjustable lift for this pivoting device. This pivotable seating of the cutting strips tends to make the device less stable and the accuracy of the resultant cuts is not high.

It will be seen that a need exists for a cutting device in a folding apparatus for a web-fed rotary printing press which overcomes the limitations of the prior art devices. The cutting device in accordance with the present invention overcomes those limitations of the prior art devices and is a significant improvement in the art.

SUMMARY OF THE INVENTION

It is an object of the present invention to provide a cutting device.

Another object of the present invention is to provide a device for transversely cutting a running web into cut products.

A further object of the present invention is to provide a cutting device for transversely cutting a web into products of variable lengths.

Still another object of the present invention is to provide a cutting device in which the wear of the cutting strip and the bending and cutting forces acting on the cutter in the movement direction of the web are minimized.

Yet a further object of the present invention is to provide a cutting device in which the adaptation of the cutting device to various product lengths is easily accomplished.

As will be discussed in detail in the description of the preferred embodiment which is presented subsequently, the cutting device in accordance with the present invention is used to accomplish the transverse cutting of running webs into products of variable lengths and is usable particularly in a folding apparatus that is situated downstream of a rotary printing press. The cutting device has a cutting cylinder support that carries two diametrically opposed cutting cylinders which rotate with, as well as with respect to, the cutting cylinder support. Each cutting cylinder carries a plurality of cutting blades with these blades being engageable with cutting strips located on the surface of a counter cutting and collection cylinder. The cutting cylinder support is rotatable at a first speed and the cutting cylinders supported by it are rotatable at a second speed. Each cutting cylinder is supported on the cutting cylinder support so that it can be shifted axially on the cylinder support. This axial shifting also causes a rotation of the shifted cutting cylinder to thereby change the rotational phases of the two cutting cylinders with respect to each other so that the product length can be varied.

A particular advantage of the cutting device in accordance with the present invention is that the approximately perpendicular relative movements of the cutters with respect to the cutting strips, which are typical in the prior art devices, can be avoided to a great extent. Bending stresses and cutting forces acting on the cutters and on the cutting strips, as well as flexing movements of the cutting strips are reduced by this elimination of perpendicular relative movements between the cutting blades and their cooperating strips. The scraping movements of the cutters in the cutting strips, which were also generated in the prior art devices, and which operated to form notches in the cutting strips, are also minimized by means of the cutting movement taking place along a straight line in relation to the counter-cutting cylinder. This cutting movement, as provided by the cutting device in accordance with the present invention, generates a higher cutting quality since tearing of the cut in the web no longer occurs. In contrast with the prior art devices, it is possible for the cutter to dip or extend more deeply into the cutting strips because of the optimized movement of the cutters provided by the present device. It is therefore possible to use cutters in the present invention which have cutting edges that do not have an equidistant spacing with respect to the axis of rotation of the cutting cylinder, such as cutters which are wedge shaped, V-shaped, or arrow shaped. A result of this is that the very large cutting forces, which had previously occurred inherently, are considerably reduced in the present device. This makes it possible to cut thicker webs or to cut more layers of webs and to thereby achieve higher production speeds. In addition, vibrational loads are reduced by use of the cutting device in accordance with the present invention.

The cutting device in accordance with the present invention overcomes a number of the limitations of the prior art devices. It is a substantial improvement in the art.

BRIEF DESCRIPTION OF THE DRAWINGS

While the novel features of the cutting device in accordance with the present invention are set forth with particularity in the appended claims, a full and complete understanding of the invention may be had by referring to the detailed description of the preferred embodiment, as presented subsequently, and as illustrated in the accompanying drawings, in which:

DETAILED DESCRIPTION OF THE PREFERRED EMBODIMENT

Figure 1:
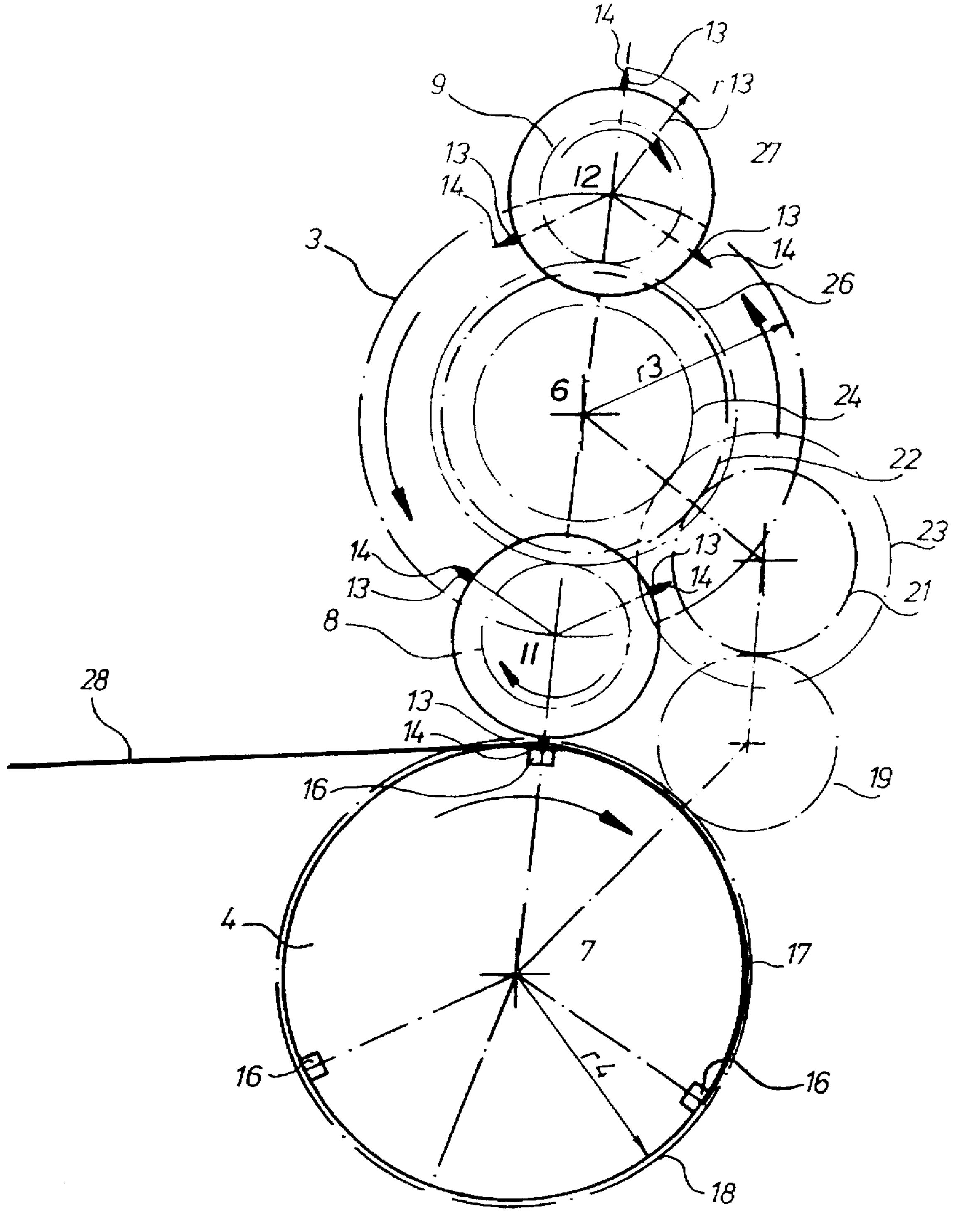
FIG. 1 is a schematic side view of a cutting device in accordance with the present invention.

Referring initially primarily to FIG. 1, there may be seen a cutting device in accordance with the present invention. As discussed above, this cutting device is typically a part of a folding apparatus and is located downstream, in a direction of travel of a printed web, from a web-fed rotary printing press. The overall folding apparatus and the web-fed rotary printing press do not form a part of the subject invention. Thus they are not shown in the drawings.

Figure 2:
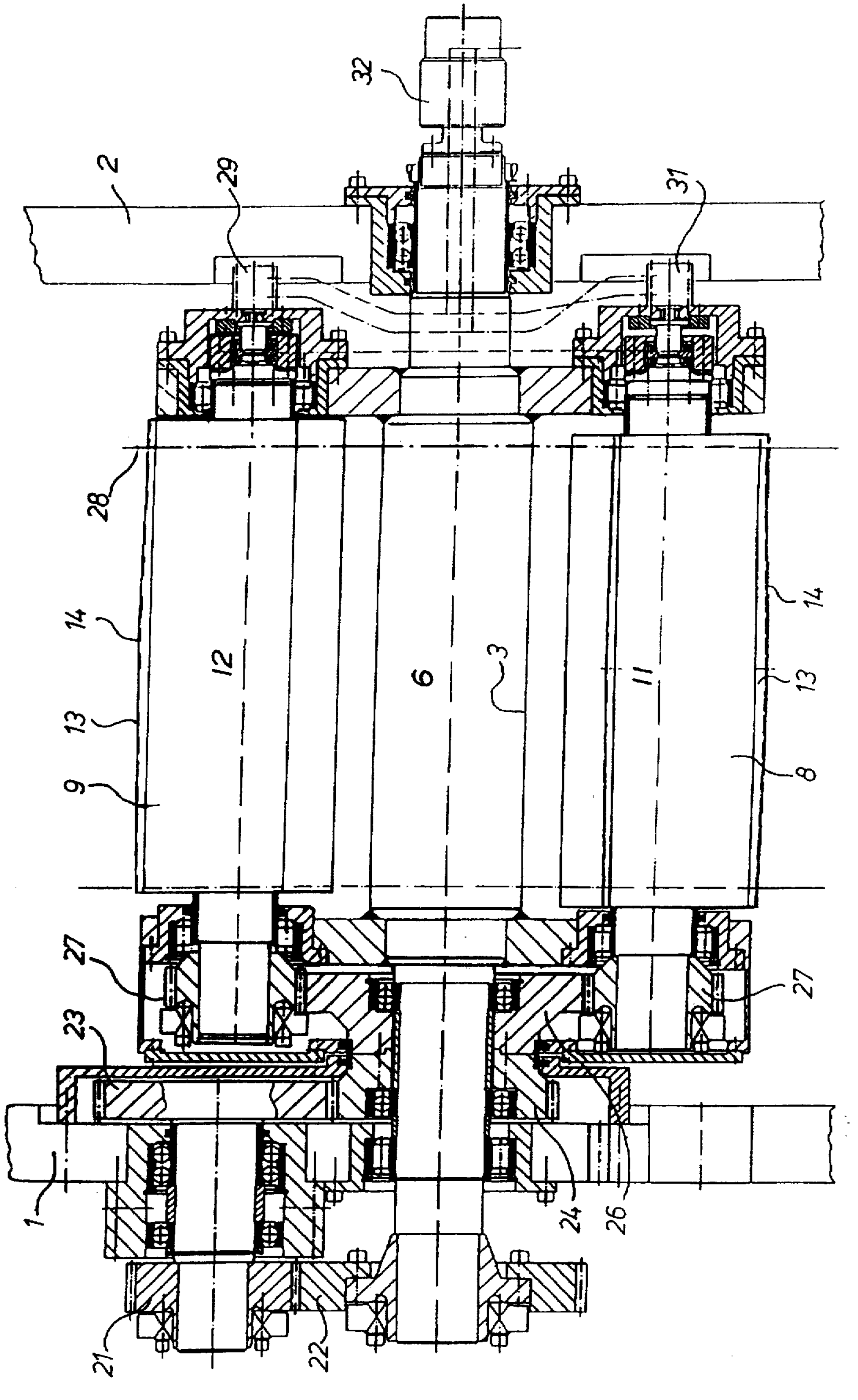
FIG. 2 is a cross-sectional view of the cutting cylinder support and the cutting cylinder in accordance with the present invention.

As may be seen most clearly in FIG. 1, a cutting cylinder support 3 and a collection and counter-cylinder 4 are seated for synchronous rotation around their respective axes of rotation 6 and 7, which extend parallel with each other, in side frames 1 and 2 of, for example, a folding apparatus of a rotary printing press. In the preferred embodiment as seen in FIGS. 1 and 2, the cutting cylinder support 3 is provided with two rotatable, axially displaceable cutting cylinders 8 and 9, whose respective axes of rotation 11 and 12 are disposed offset by 180° with respect to each other and concentrically at a radius r3 of, for example, r3=300 mm with respect to the axis of rotation 6 of the cutting cylinder support 3. During a cutting operation, the cutting cylinder support 3 turns at the same time as, and synchronously with, the collection cylinder 4. The cutting cylinders 8 and 9 rotate in the opposite direction from the collection cylinder 4 during a cutting operation. Three cutters 13 are fastened in each one of these cutting cylinders 8 and 9, and extend parallel with the axes of rotation 11 and 12 of the cutting cylinders 8 and 9. These cutters 13 are offset from each other by 120° and have cutting edges 14 which are disposed at a radius r13 of, for example, r13=150 mm, concentrically in respect to the axes of rotation 11 and 12 of the respective cutting cylinders 8 and 9. Thus, each cutting cylinder 8 and 9 carries three cutting blades 13 and each cutting cylinder 8 and 9 rotates with, as well as independently of, the cutting cylinder support 3. It will be understood that the collection cylinder 4 is shown as rotating in a clockwise direction and that the cutting cylinder support 3 is shown as rotating in the counterclockwise direction, as indicated by the arrows interground on each cylinder. Since these two elements are situated on opposing sides of a web 28 to be cut, these two cylinders are effectively both rotating in the same direction with respect to the two opposed surfaces of the web 28 even though their direction of rotation about their respective axes 7 and 6 are opposite to each other. In a similar manner, the two cutting cylinders 8 and 9 which are carried by the cutting cylinder support 3 are both rotating in a clockwise direction with respect to their respective axes of rotation 11 and 12. Even though cutting cylinders 8 and 9, as well as collection and counter-cylinder 4 are all rotating in the clockwise direction, with respect to their individual axes of rotation, they are rotating in opposing directions with respect to the surfaces of the web 28 to be cut.

The collection cylinder 4 is used as the counter-cylinder for the cutting cylinders 8 and 9 and is therefore provided with cutting strips 16, fixed on the cylinder. Three cutting strips 16, offset from each other by 120°, have been set immovably and congruently with a surface 17 of the collection cylinder 4 at a radius r4 of, for example, r4=300 mm, concentrically in respect to the axis of rotation 7 of the collection cylinder 4. These three cutting strips 16 on the surface 17 the collection and counter-cylinder 4 are generally conventional and cooperate with the individual cutting blades 13 that are situated on the surface of the cutting cylinders 8 and 9 to transversely cut or sever the web 28 as it passes between the cooperating cutting cylinder 8 or 9 and the collection and counter-cylinder 4.

Referring now primarily to FIG. 2, the driving of the cutting cylinders 8 and 9 is performed by means of a planetary toothed wheel gear which originates from a main toothed wheel drive train. The collection cylinder 4 has a collection cylinder gear wheel 18 with a number of teeth z18, for example, z18=132, and which is driven by a drive apparatus, not shown. A first intermediate gear wheel 19 is seated in the side frame 1 and is provided with a number of teeth z19, for example z19=64. First intermediate gear wheel 19 meshes with this gear wheel 18 of the collection cylinder 4 in order to drive the cutting cylinder support 3, and in turn, it cooperates with a second intermediate gear wheel 21, that is seated in the side frame 1, and that is provided with a number of teeth z21, for example z21=64. This second intermediate gear wheel 21 rolls off against a cutting cylinder support drive gear wheel 22 with a number of teeth z22, for example z22=88, of the cutting cylinder support 3, because of which the cutting cylinder support 3 is driven and rotates at a speed n3. A cutting cylinder main drive gear wheel 23 with a number of teeth z23, for example z23=39, is connected with the second intermediate gear wheel 21, and meshes with a freely rotatable gear wheel 24, which is seated freely rotatable and concentrically with the axis of rotation 6 of the cutting cylinder support 3, with a number of teeth z24, for example z24=33. A sun gear wheel 26 with external, helical teeth with a number of teeth z26, for example z26=96, is connected with this freely rotatable gear wheel 24. A planetary gear wheel 27 with helical teeth of each of the respective cutting cylinders 8 and 9, and with a number of teeth z27, for example z27=36, meshes with the sun gear 26. As may be seen in FIG. 2 the planetary gear 27 for each of the two cutting cylinders 8 and 9 is in gear mesh engagement with the sun gear 26. Thus when the sun gear 26 is driven by the freely rotatable sun gear drive 24, both of the cutting cylinders 8 and 9 will be caused to rotate at the same speeds about their respective axes of rotation 11 and 12 with respect to the cutting cylinder support 3. At the same time, the cutting cylinder support 3 is being rotated about its own axis of rotation 6 by the engagement of the cutting cylinder support drive gear wheel 22 with the second intermediate gear wheel 21.

The cutting strips 16, situated on the surface 17 of the collection cylinder 4, cooperate with the cutters 13 positioned on the surfaces of the two cutting cylinders 8 and 9. For this reason, the speed n3 of the cutting cylinder support 3 must be 1.5 times the speed n4 of the collection cylinder 4, i.e. n3=1.5×n4 since r3 is less than r4. In order to obtain an approximately radial alignment of the cutters 13 in respect to the collection cylinder 4 during cutting, the speed n8 of the cutting cylinders 8 and 9 is the sum of the amount of the speed n3 of the cutting cylinder support 3 and an amount of the speed n4 of the collection cylinder 4, i.e. n8=|n3|+|n4|. With the executed radii r3, r4 and r13, an approximately equal circumferential speed of the cutters 13 and the cutting strip 16 results during cutting.

A web 28, for example a paper web, a foil web or a textile web, is guided on the collection cylinder 4 and is cut into signatures by means of the cutters 13 and cutting strips 16. To this end, the cutting cylinders 8 and 9 and therefore the cutters 13 turn around their respective axes of rotation 11 and 12. This rotary movement is performed by means of the above described drive mechanism in such a way that the respective cutter 13 involved in the actual cutting process performs an approximately radial movement directed toward the axis of rotation 7 of the collection cylinder 4 from the start to the end of the cutting process, i.e. from striking the web 28 until lifting off the web 28. This approximately radial movement has a small parallel offset from the ideal radial direction, wherein this offset can be minimized by varying the radii r3, r4 and r13. In the process, both the respective cutter 13 and the respective cutting strip 14 move at approximately the same velocity of trajectory. As can be seen in FIG. 1, the cutter 13 moves radially in the direction toward the collection cylinder 4, cuts the web 28, and enters the cutting strip 16. In this lowest position of the cutter 13 in the cutting strip 16, the axes of rotation 6, 7, 11 and 12 and the cutter 13 are located on a common straight line. There the radial velocity of the cutter 13 is zero and the lifting movement of the cutter 13 begins. The lifting movement of the cutter 13 also takes place radially in relation to the collection cylinder 4.

Turning now again to FIG. 2, the mechanism by which the cutting cylinders 8 and 9 are made to be shifted axially with respect to the cutting cylinder support 3 will be discussed in detail. Cylinders which can be charged with a pressure medium, for example pneumatic cylinders 29, 31, are fixed in place on the cutting cylinder support 3, and act on the respective cutting cylinders 8 and 9 at their axial ends opposite to the planetary gears 27. The required pressure medium is supplied to the pneumatic cylinders 29 and 31, for example by means of a rotary inlet 32 that is centrally fastened on the cutting cylinder support 3. The pneumatic cylinders 29 and 31 of the cutting cylinders 8 and 9 are connected in such a way that in the non-collecting position, the first cutting cylinder 8 is in its initial position, closest the first side frame 1, and the second cutting cylinder 9 is in its initial position, closest the second side frame 2. In this orientation, the planetary gear wheels 27 of the oppositely located cutting cylinders 8 and 9 are disposed with the cutting cylinders 8 and 9 with their respective cutters 13 situated in such a way that, in the non-collecting position of the cutting cylinders 8 and 9 and of the collection cylinder 4, the cuts of the two cutting cylinders 8 and 9 are performed exactly offset by 180° in respect to each other.

When it is desired to convert the folding device from non-collect to collect production, the cylinder 4 will act as a collecting cylinder. As is known, when in collect production, the transversely cut signatures should be provided with slightly differing lengths so that the folded product will have smooth edge surfaces. Accordingly, for collecting products, the two cutting cylinders 8 and 9 are brought into their collecting positions. To this end, the pneumatic cylinders 29 and 31 are actuated, and because of this the first cutting cylinder 8 is axially displaced from its initial position closest to or adjacent to the first side frame 1 into an end position closest to the second side frame 2. The second cutting cylinder 9 is also moved from its initial position closest to or adjacent to the side frame 2 into an end position closest to the first side frame 1. A relative twisting or rotation of each of the cutting cylinders 8 and 9 in the circumferential direction about each cylinder's axis of rotation in relation to each other and to the cutting cylinder support 3 takes place because of the helically-toothed planetary gear wheels 27 and the helically toothed sun gear wheel 26 cooperating with them. Of the two cutting cylinders 8 and 9, the first cutting cylinder 8 is phase-shifted in the direction of rotation of these two cutting cylinders 8 and 9 and the second cutting cylinder 9 is phase shifted opposite to the direction of rotation of these two cutting cylinders 8, 9 in accordance with the helical settings of the teeth of the planetary gear wheels 27 and of the sun gear wheel 26. This has the result that the cutters 13 generate unequal, alternating cut lengths on the collection cylinder 14. During collection, cutting is performed on the cutting strips 16 alternatingly ahead of and behind the cutting position of the cutter 13 during non- collection. The result is that the lengths of each successive signature is different from the length of the preceding signatures. The first signature collected on the collection cylinder 4 will have a different overall length than the signature collected on top of it with the result being a folded product with a smooth, flat planar edge surface. The axial shifting of the two cylinders 8 and 9 can be controlled to provide the appropriate difference in signature lengths as a function of the number of sheets in each web stack that is being cut.

Instead of utilizing the pneumatic cylinders 29 and 31 to shift the cutting cylinders 8 and 9, the axial displacement of the cutting cylinders 8 and 9 can also be performed by means of other suitable drive elements, such as electric motors, linear motors, electromagnets, or the like. In the same way, it is possible to keep the cutting cylinders 8 and 9 axially fixed on the cutting cylinder support 3 and to perform the phase shift in the rotary movement of the cutting cylinders 8 and 9 in the direction toward the cutting cylinder support 3 or the collection cylinder 4 by use of releasable planetary gear wheels 27, for example, which can be displaced in the circumferential direction in relation to the cutting cylinders 8 and 9. To this end, the cutting cylinders 8 and 9 can be connected with their respective planetary gear wheels 27 by means of a frictionally connected coupling.

In a second preferred embodiment of the present invention, which is not specifically depicted in the drawings, the planetary gear wheels 27 of the cutting cylinders 8 and 9 can be provided with teeth whose helix angles are oppositely directed. These planetary gear wheels 27 engage, axially offset, a sun gear wheel 26 with corresponding arrow-shaped teeth. The sun gear wheel 26 is axially displaceable to accomplish the desired counter-directed phase shift of the cutting cylinders 8 and 9, while the cutting cylinders 8 and 9 maintain their axial position.

While a preferred embodiment of a cutting device in accordance with the present invention has been set forth fully and completely hereinabove, it will be apparent to one of skill in the art that a number of changes in, for example, the particular folding apparatus, the type of rotary printing press, the type of web being printed and the like may be made without departing from the true spirit and scope of the present invention which is accordingly to be limited only by the following claims.

What is claimed is:

1. A cutting device usable for the transverse cutting of a running web into cut products of variable length in a folding apparatus of a rotary printing press comprising:

a collection and counter-cylinder having a plurality of cutting strips positioned evenly spaced on a peripheral surface of said collection and counter-cylinder, said collection and counter-cylinder being supported for rotation;

a cutting cylinder support cooperatively positioned with respect to said collection and counter-cylinder and supported for rotation at a first speed about a cutting cylinder support axis of rotation;

at least first and second cutting cylinders, each of said first and second cutting cylinders being provided with at least one cutter, each said cutter cooperating with said collection and counter-cylinder, said at least first and second cutting cylinders each being situated on said cutting cylinder support for rotation with and with respect to said cutting cylinder support, each of said at least first and second cutting cylinders rotating at a second speed; and means for adjusting the rotational phase of said at least first and second cutting cylinders with respect to each other and with respect to said cutting cylinder support.

2. The cutting device in accordance with claim 1 wherein said first and second speeds are selected so that said at least one cutter disposed on each of said at least first and second cutting cylinders performs a radial cutting movement with respect to an axis of rotation of said collection and counter-cylinder.

3. The cutting device in accordance with claim 1 wherein said second speed is a sum of said first speed and a speed of rotation of said collection and counter-cylinder.

4. The cutting device of claim 1 further including a planetary gear having helical teeth for each of said at least first and second cutting cylinders, each said planetary gear being usable to drive its associated one of said at least first and second cutting cylinders, and a sun gear wheel having helical teeth and usable to drive each of said planetary gears, said sun gear wheel and said planetary gears being axially shiftable with respect to each other to accomplish said rotational phase adjustment.

5. The cutting device of claim 4 wherein each said planetary gear is fixedly connected with its associated one of said at least first and second cutting cylinders and further wherein each said cutting cylinder is supported to be shifted axially on said cutting cylinder support with respect to said cutting cylinder support axis of rotation.

6. The cutting device in accordance with claim 1 wherein said first and second cutting cylinders are offset with respect to each other by 180° on said cutting cylinder support and are counter-rotatable and axially displaceable with respect to each other.

* * * * *